United States Patent
Smith et al.

[11] Patent Number: 5,855,412
[45] Date of Patent: Jan. 5, 1999

[54] COMBINATION DIAPER BAG AND SHOPPING CART SEAT CUSHION

[76] Inventors: Sandy Leigh Smith, 8153 Taylor St., Covington, Ga. 30014; Jim O'Neal Biggers, 3779 Grant Rd., Ellingwood, Ga. 30294

[21] Appl. No.: 941,431

[22] Filed: Sep. 30, 1997

[51] Int. Cl.$^6$ .................................................. A47D 1/10
[52] U.S. Cl. ................. 297/256.17; 297/229; 297/217.1; 297/219.1; 297/440.12; 190/2; 190/8; 224/411; 280/33.993
[58] Field of Search ........................... 297/256.17, 250.1, 297/217.1, 219.1, 229, 440.12; 224/411, 575, 577; 190/2, 1, 8; 280/33.993

[56] References Cited

U.S. PATENT DOCUMENTS

| | | | |
|---|---|---|---|
| 3,489,194 | 1/1970 | Hoover | 190/2 X |
| 4,108,489 | 8/1978 | Salzman | 295/256.17 X |
| 4,154,323 | 5/1979 | Sneider | 190/2 |
| 4,188,988 | 2/1980 | Agyagos | 190/2 X |
| 4,190,918 | 3/1980 | Harvell | 190/2 X |
| 4,204,695 | 5/1980 | Salzman | 297/256.17 X |
| 4,324,430 | 4/1982 | Dimas, Jr. et al. | 297/256.17 |
| 4,535,878 | 8/1985 | Grahl | 190/8 X |
| 4,655,502 | 4/1987 | Houllis | 297/229 |
| 4,666,207 | 5/1987 | Quartano | 297/229 |
| 4,679,242 | 7/1987 | Brockhaus | 190/8 X |
| 4,805,937 | 2/1989 | Boucher et al. | 297/229 X |
| 4,824,168 | 4/1989 | Makoski | 297/229 |
| 4,886,150 | 12/1989 | Fitzsimmons | 190/2 X |
| 5,238,293 | 8/1993 | Gibson | 280/33.993 X |
| 5,330,250 | 7/1994 | Reyes | 297/256.17 X |
| 5,390,381 | 2/1995 | LaMantia | 190/2 X |
| 5,481,767 | 1/1996 | Lewis | 190/2 X |
| 5,547,250 | 8/1996 | Childers | 297/256.17 |
| 5,584,422 | 12/1996 | Bond-Madsen | 297/229 X |
| 5,611,625 | 3/1997 | Legendre | 190/2 X |
| 5,649,658 | 7/1997 | Hoffman et al. | 190/2 X |
| 5,678,888 | 10/1997 | Sowell et al. | 297/229 X |

FOREIGN PATENT DOCUMENTS

| | | | |
|---|---|---|---|
| 4140509 | 5/1993 | Germany | 280/33.993 |

*Primary Examiner*—Peter M. Cuomo
*Assistant Examiner*—Rodney B. White
*Attorney, Agent, or Firm*—Kenneth L. Tolar

[57] ABSTRACT

A combination shopping cart seat cushion and diaper bag includes a substantially rectangular seat panel with foldable front, back and two side panels depending therefrom. A foldable top panel depends from the back panel. The panels may be folded from a flat position to form a box shaped diaper bag. The front panel may be folded downward and the top panel may be folded over a shopping cart seat backrest to form a shopping cart seat cushion. An accessory panel may be removably attached to either the top or the back panels using velcro strips or other suitable attachment means. A seat/diaper changing cushion may be removably attached to the upper surface of the seat panel when the device is being used as a shopping cart seat cushion providing additional comfort to a child sitting therein. An elongated, tublar shopping cart handle cover is also provided having a longitudinal slit for slipping the cover over a shopping cart handle and a longitudinal bore therethrough for receiving said shopping cart handle.

9 Claims, 4 Drawing Sheets

COMBINATION DIAPER BAG AND SHOPPING CART SEAT CUSHION

BACKGROUND OF THE INVENTION

Shopping cart seats generally comprise a flat plastic seat portion with a metal frame backrest. These seats are very uncomfortable for children who often sit therein for long periods of time while their parents shop. Because so many different children use the shopping cart seat, it is also a good source for transmitting germs and contagious diseases. In addition, when parents bring their children to a store, it is usually necessary to transport diapers, bottles, toys, pacifiers, wet wipes, baby food and similar items using a diaper bag or a similar storage bag. Simultaneously carrying a diaper bag while pushing a shopping cart is difficult and cumbersome. Hanging the diaper bag on the shopping cart or storing it therein is not a viable solution because the contents are inaccessible.

The present invention addresses the above described problems by providing a rectangular, box shaped diaper bag which may be quickly and easily converted to a shopping cart seat cushion. In addition, the shopping cart seat cushion comprises a removably attached seat/diaper changing cushion, a removably attached accessory panel for storing bottles and similar items and a shopping cart handle cover adapted to support a number of toys. Therefore, a user may bring toys, diapers, bottles, etc. in the diaper bag, convert the diaper bag to a shopping cart seat cushion and suspend and store the items thereon so that they are readily accessible.

DESCRIPTION OF THE PRIOR ART

Many devices currently exist in the prior art that provide shopping cart seat cushions or covers. Other devices exist which are designed to cover a shopping cart handle and seat portions so as to protect a child from any germs thereon. However, none of these devices have the unique feature of being easily foldable into a convenient, easy to carry diaper bag. U.S. Pat. No. 5,330,250 issued to Reyes discloses a liner for a shopping cart child seat comprising a padded backrest and an extension therefrom for supporting an infant's legs. A strap holds the device to the shopping cart and another strap secures the infant within the seat. The device is designed to allow a child to sit comfortably upright in a shopping cart.

U.S. Pat. No. 4,805,937 issued to Boucher et al relates to a shopping cart handle and seat cover. The handle cover comprises a padded strip of foldable fabric material which is attached to a shopping cart handle using a plurality of velcro straps. The handle cover has means for removably attaching various toys. Also included is a foldable seat with side, back and bottom portions.

U.S. Pat. No. 4,655,502 issued to Houllis discloses a multi-adjustable cushion for a shopping cart comprising a foldable seat cushion with a back portion that can be adjusted to fit the width of the cart. The front portion of the seat is rolled about the cart handle providing a cover therefor.

U.S. Pat. No. 4,824,168 issued to Makoski discloses an organizing apparatus for an umbrella type stroller. The apparatus has a seat portion which is strapped to a stroller seat. Several pockets are provided on the back for storing bottles, diapers and other various articles therein. As indicated above, none of the described prior art devices disclose means for quickly and easily converting a diaper bag to a shopping cart seat cushion. The present invention provides such a device having a removably attachable seat/diaper changing cushion as well as a removably attachable accessory panel.

SUMMARY OF THE INVENTION

The present invention relates to a combination diaper bag/shopping cart seat cushion. The device comprises a plurality of foldably engaging, substantially rectangular panels. The panels each have velcro or a similar attachment means on a side thereof and may be folded and attached to form a boxed shaped carrying case with a sealable lid allowing diapers and other articles to be stored therein. The device with the various necessities stored therein may be taken into a store where it may be quickly converted to a shopping cart seat cushion. To convert the diaper bag version, the lid portion is folded backwards until it lays flat against the backrest of the shopping cart. The front panel of the diaper bag is folded underneath the bottom portion of the diaper bag. The device may then be easily inserted into a standard shopping cart seat. An accessory panel may be removably attached to the lid portion when it is folded over the back of a shopping cart seat backrest. A seat/diaper changing cushion may be removably a attached to the seat panel when the device is being used as a seat cushion. The device also comprises an elongated, foam rubber tubular shopping cart handle cover having a longitudinal slit so that it may be easily slipped over the handle. It is therefore an object of the present invention to provide a shopping cart seat cover which may be easily converted to a diaper bag.

It is yet another object of the present invention to provide a shopping cart seat cushion which has an accessory panel for storing bottles, toys and similar items removably attached thereto.

It is yet another object of the present invention to provide a shopping cart seat cushion and diaper bag combination which has a diaper changing/seat cushion removably attached thereto.

It is yet another object of the present invention to provide a shopping cart seat cushion/diaper bag to be used in conjunction with a shopping cart handle cover.

It is yet another object of the present invention to provide a shopping cart handle cover having means for hanging toys, bottles, pacifiers and other items thereon.

It is yet another object of the present invention to provide a shopping cart seat cushion/diaper bag that provides additional comfort for a child riding in a shopping cart while preventing the child from being exposed to dirt, germs and contagious diseases. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
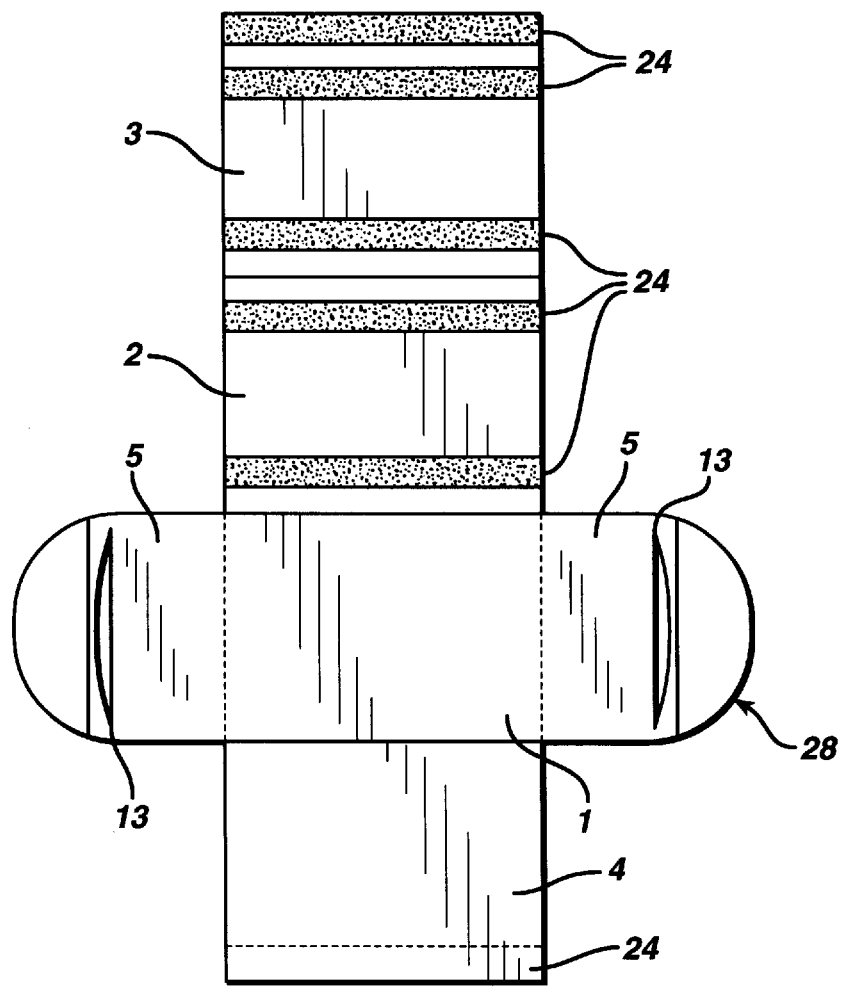
FIG. 1 depicts inventive device with the various panels detached and laying flat.

Referring now to FIGS. 1 through 6, the present invention relates to a combination diaper bag/shopping cart seat cushion assembly. The device comprises a plurality of substantially rectangular, planar panels each having four peripheral edges and two sides. Preferably, the device comprises a seat panel 1, a back panel 2, a top panel 3 and a front panel 4. The back panel 2 is integrally adjacent a longitudinal edge of the seat panel 1 with a fold line formed therebetween. The front panel 4 is integrally adjacent a longitudinal edge of the seat panel 1, opposite the back panel 2, with a fold line formed therebetween. The back panel 2, the top panel 3 and the front panel 4 preferably each have an attachment means such as Velcro® 24 on a side thereof. However, any other convenient attachment means such as snaps, zippers, etc. may also be used.

Depending from each of the latitudinal edges of the seat panel 1 are opposing side panels 5 each having a substantially rectangular configuration with a fold line formed between the side panels and the seat panel. The side panels 5 form side walls for the diaper bag or seat cushion when placed in the vertical position. On the inwardly facing side of each side panel 5 is a storage pocket 13 for storing diapers or other items therein. Each of the side panels 5 has an attachment means such as Velcro® on a side thereof for securing the panels 5 to the back and front panels 2,4. On a distal edge of each of the side panels is a loop, hook or a U-shaped handle 28 allowing the device to be easily carried.

The top panel 3 has an elongated substantially rectangular flap 14 having a smaller area than the top panel integrally adjacent and foldably engaging a longitudinal edge thereof opposite said back panel 2. The flap 14 has an attachment means such as Velcro® on a side thereof for engaging a similar attachment means on a side of the front panel 4 to seal the top panel 3 when the device is being used as a diaper bag 21.

Figure 5:
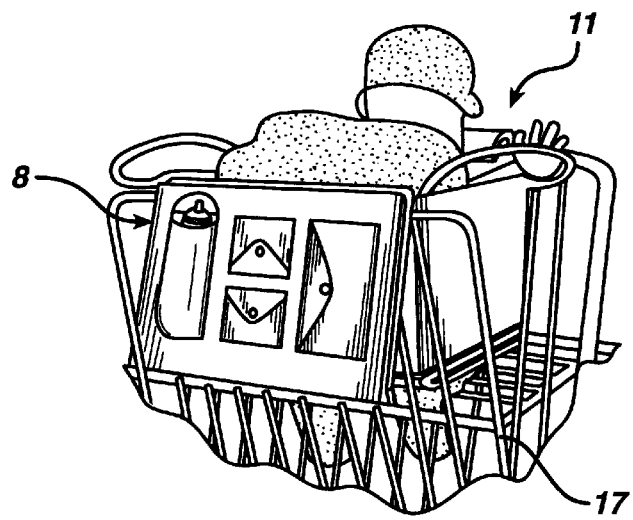
FIG. 5 depicts the shopping cart seat cushion version with the lid component folded over the backrest and the accessory panel attached thereto.
Figure 6:
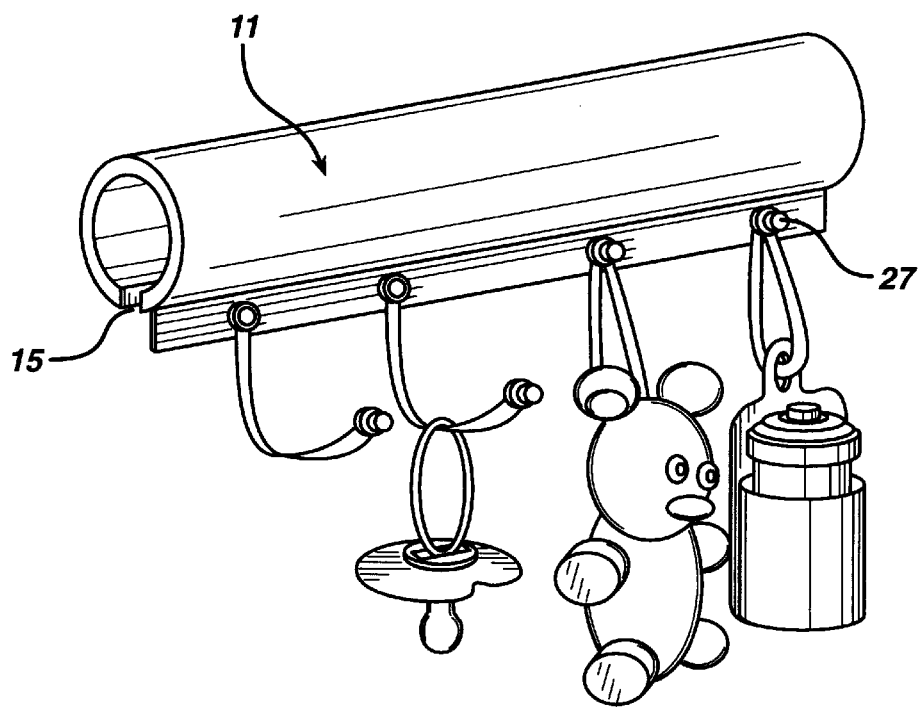
FIG. 6 depicts the tubular shopping cart handle cover with the plurality of hooks attached thereto for receiving toys, pacifiers, etc.

The device also comprises a substantially rectangular accessory panel 8. On a side of the accessory panel 8 is a plurality of storage compartments. The storage compartments 20 each comprise a flat piece of suitable material preferably having four sides, three of which are attached to the exterior surface of the accessory panel to form a holding pouch. The holding pouches may be configured to receive wet wipes, baby bottles or other similar articles. Each of the storage compartments preferably have a lid component removably attached thereto for securing any items stored in the compartments 20. On an opposite side of the accessory panel 8 are a plurality of fastener means 25 such as Velcro® allowing the accessory panel 8 to be removably attached to the top panel 14 when it is folded over the shopping cart seat backrest as depicted in FIG. 5. Such items when carried into a store using the diaper bag may then be stored on the accessory panel when the bag 21 is converted to a seat cushion. Alternatively, the accessory panel 8 may be attached to the inwardly facing side of the back panel 2 when the device is being used as a diaper bag.

A seat/diaper changing cushion 10 is also provided. The cushion 10 comprises a substantially rectangular panel having four peripheral edges and two sides with a cushion or padded type material on a side thereof. In addition, a plurality of fastener means 16 such as Velcro® would be on an opposite side for removably attaching the seat/diaper changing cushion 10 to the seat panel 1. When the device is being used as a shopping cart seat cushion, the seat/diaper changing cushion 10 is attached to the upper surface of the seat panel providing additional comfort to a child sitting therein. Moreover, the cushion 10 may be used as a flat support means for changing a child's diaper.

Figure 2:
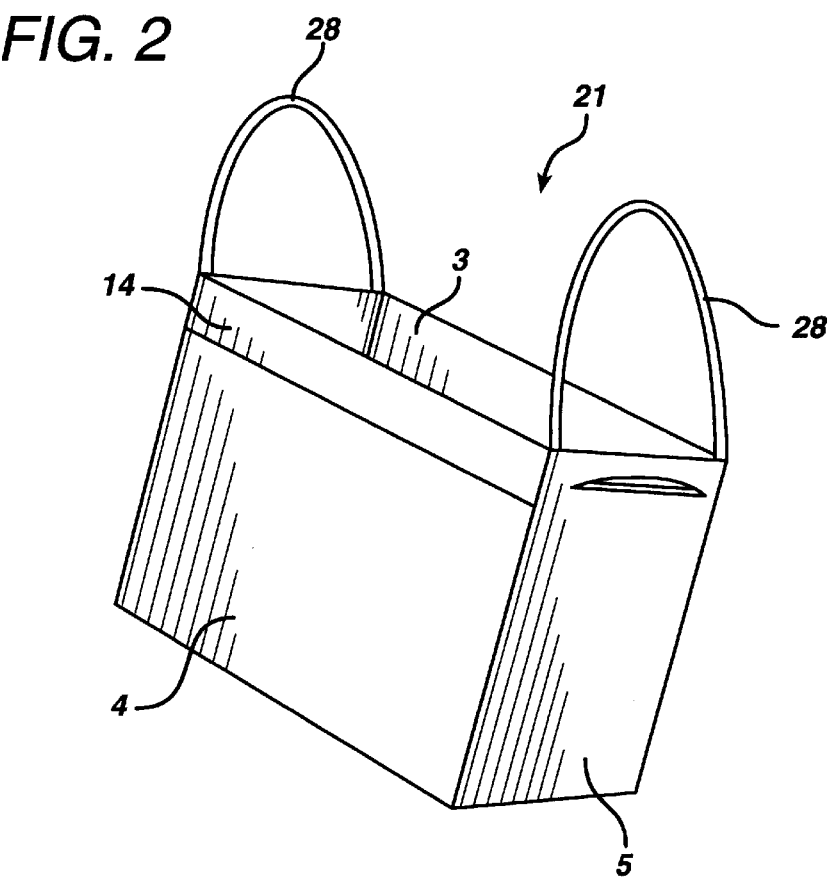
FIG. 2 depicts inventive device folded into the diaper bag version.
Figure 3:
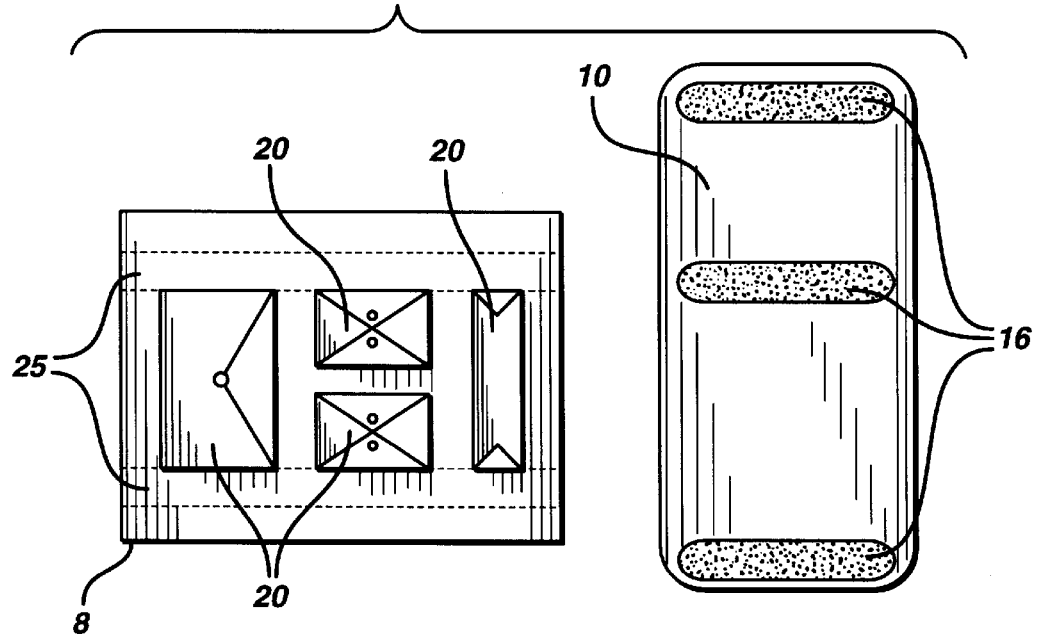
FIG. 3 depicts the accompanying accessory panel and seat/diaper changing cushion.
Figure 4:
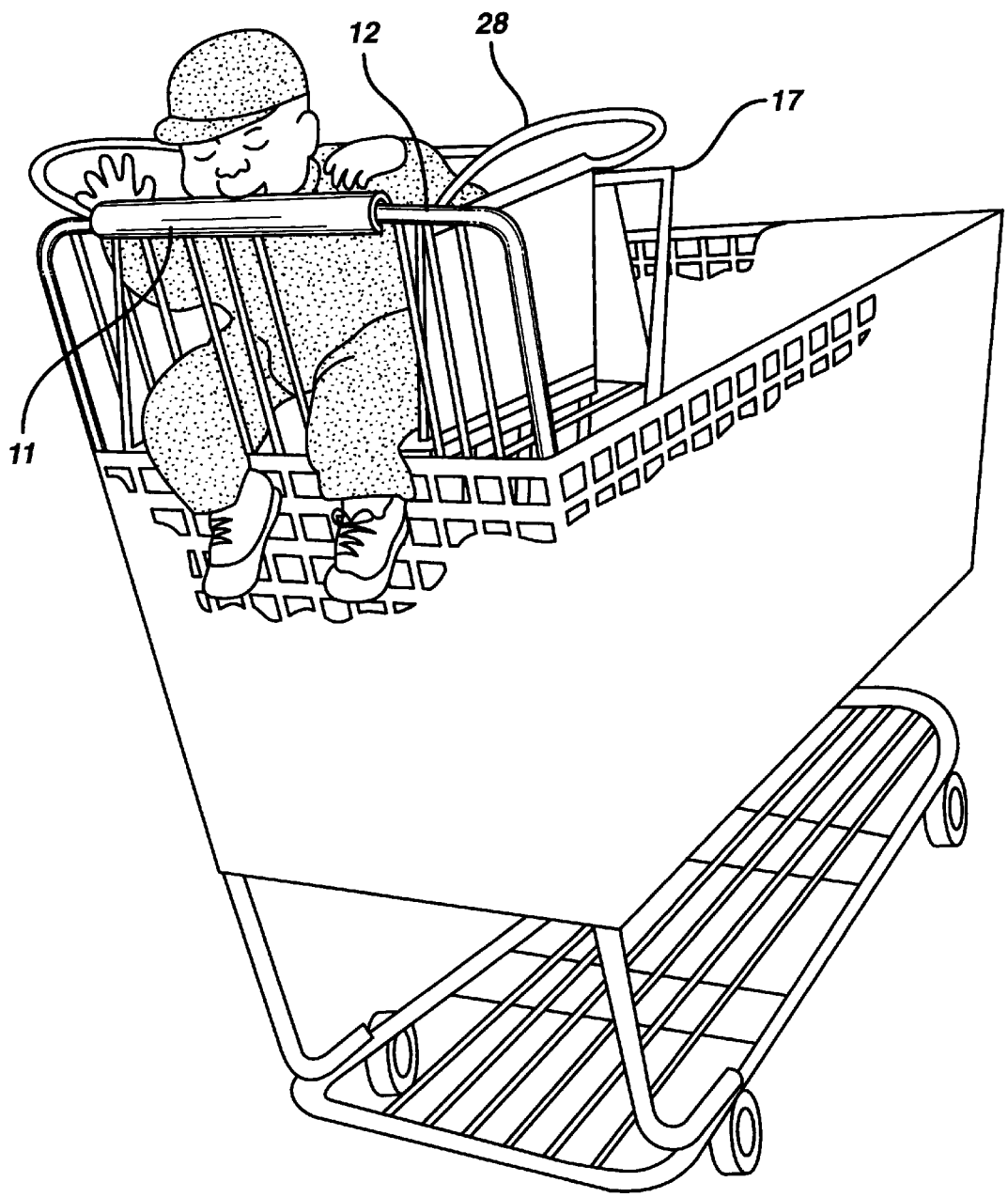
FIG. 4 depicts the shopping cart seat cushion version.

The present invention also comprises an elongated tubular shopping cart handle cover 11. Preferably, the handle cover 11 is made from foam rubber or a similar flexible, padded material. The handle cover 11 has a longitudinal, axially aligned bore therethrough for receiving a shopping cart handle 12. In addition, the cover has a longitudinal slit 15 on its exterior surface allowing the cover 11 to be easily slipped over or removed from a shopping cart handle. Preferably, the handle cover 11 has a plurality of attachment means 27 on its exterior surface such as hooks for receiving toys, pacifiers, etc. To use the device as described above, each of the substantially rectangular panels are folded upwardly to form a box as depicted in FIG. 2. The top panel 3 is folded in a horizontal position to enclose the side walls 5, back 2, seat 1 and front panels 4. The rectangular flap 14 may then be attached to the front panel 4 to secure items within the bag. The device may then be used as a diaper bag 21 or a similar carrying case.

To use the device as a shopping cart seat cushion, the front panel 4 is folded downwardly and back underneath the seat panel 1 until it rests flat thereagainst. The top panel 3 is folded backwards over a shopping cart seat backrest 17 until it rests flat thereagainst. The side panels remain in a vertical position as depicted FIG. 4. The device may then be inserted into a standard shopping cart seat allowing a child to sit therein. The seat changing cushion 10 may then be attached to the upwardly facing side of the seat panel 1. Alternatively, the accessory panel 8 may be attached to a side of the top panel 3 when it is hanging over the back of the shopping cart seat.

Preferably the above components of the inventive device are constructed with vinyl and an interior foam core. However, as will be readily apparent to those skilled in the art, the device may be constructed with an unlimited number of materials or combinations thereof and may be designed in varying shapes, sizes and configurations without departing from the spirit of the invention. From the above description, it is now apparent that present invention provides a new shopping cart seat cushion which may be easily converted to a diaper bag. Although there has been shown and described the preferred embodiment of the present invention, it is understood by those skilled in the art that the invention is not limited to the details of construction and arrangement of parts described above. Therefore, the scope of the invention is to be interpreted and limited only in conjunction with the appended claims.

What is claimed is:

1. A combination diaper bag/shopping cart seat cushion comprising:

a box type container having a substantially rectangular horizontal seat panel;

a front, a back and two opposing side panels perpendicularly depending therefrom; each having top, bottom and two opposing side edges with a bottom edge foldably attached to a designated edge of the seat panel with their remaining edges being separable allowing the front panel to be folded beneath the seat cushion and the top panel to be folded over a shopping cart seat back rest to form a shopping cart seat cushion;

a horizontal top panel having a rear edge foldably attached to the top edge of said rear panel to form a lid for said box type container.

2. A combination diaper bag/shopping cart seat cushion comprising:

a box type container including a substantially rectangular seat panel having four peripheral edges;

a pair of side panels each having first and second opposing side edges, a top edge and a bottom edge, the bottom edge of a first side panel edge foldably attached to an edge of said seat panel with the bottom edge of the second side panel foldably attached to the opposing edge of said seat panel;

a back panel having two opposing side edges, a top edge and a bottom edge with the bottom edge foldably attached to a third edge of said seat panel with its side edges removably attached to the first side edges of said side panels;

a front panel having two opposing side edges, a top edge and a bottom edge with the bottom edge foldably attached to the fourth edge of said seat panel with each side edge removably attached to the second side edges of said side panels;

a top panel having two opposing side edges a front edge and a rear edge, with a first side edge removably attached to a top edge of a side panel and a second side edge removably attached to the top edge of the opposing side panel, the rear edge foldably attached to the top edge of said back panel, whereby the top panel may be separated from the front and side panels and folded over a shopping cart seat back rest and the front panel may be separated from the side panels and folded beneath the seat panel to form a shopping cart seat cushion.

3. A combination diaper bag/shopping cart seat cushion according to claim 1 further comprising an attachment means on a side of said front panel proximal its top edge;

a substantially rectangular flap foldably attached to the front edge of said top panel, said flap having an attachment means thereon for selectively engaging the attachment means on said front panel.

4. A combination diaper bag/shopping cart seat cushion according to claim 1 further comprising a substantially rectangular accessory panel having two sides with a plurality of storage pockets on a side thereof, said panel removably attachable to said back panel and said top panel.

5. A combination diaper bag/shopping cart seat cushion according to claim 1 further comprising a substantially rectangular seat/diaper changing cushion having a soft padded material on a side thereof, said cushion removably attachable to said seat panel.

6. A combination diaper bag/shopping cart seat cushion according to claim 1 wherein said side panels have a handle means attached to the top edge thereof.

7. A combination diaper bag/shopping cart seat cushion according to claim 1 wherein said side panels have a pocket on a side thereof.

8. A combination diaper bag/shopping cart seat cushion according to claim 1 further comprising:

an elongated tubular shopping cart handle cover having a longitudinal slit in communication with a longitudinal, axial bore for receiving a shopping cart handle.

9. A combination diaper bag/shopping cart seat cushion according to claim 8 wherein said shopping cart handle cover further comprises a plurality of hooks on its exterior surface for receiving accessory items.

* * * * *